Feb. 26, 1935.  S. J. SWANSON  1,992,725
SINGLE PHASE MOTOR
Filed Feb. 15, 1932  4 Sheets-Sheet 1
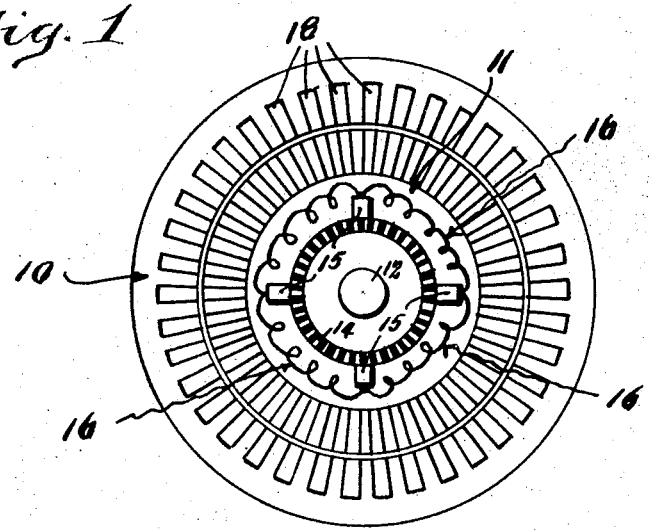
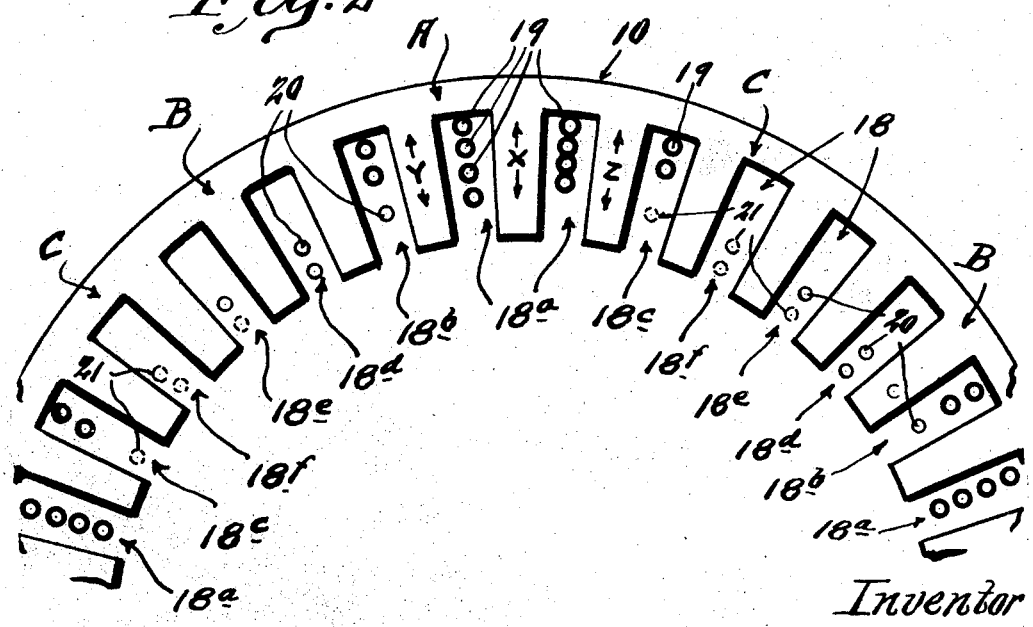
Inventor
Swan J. Swanson
By William Janus Atty.

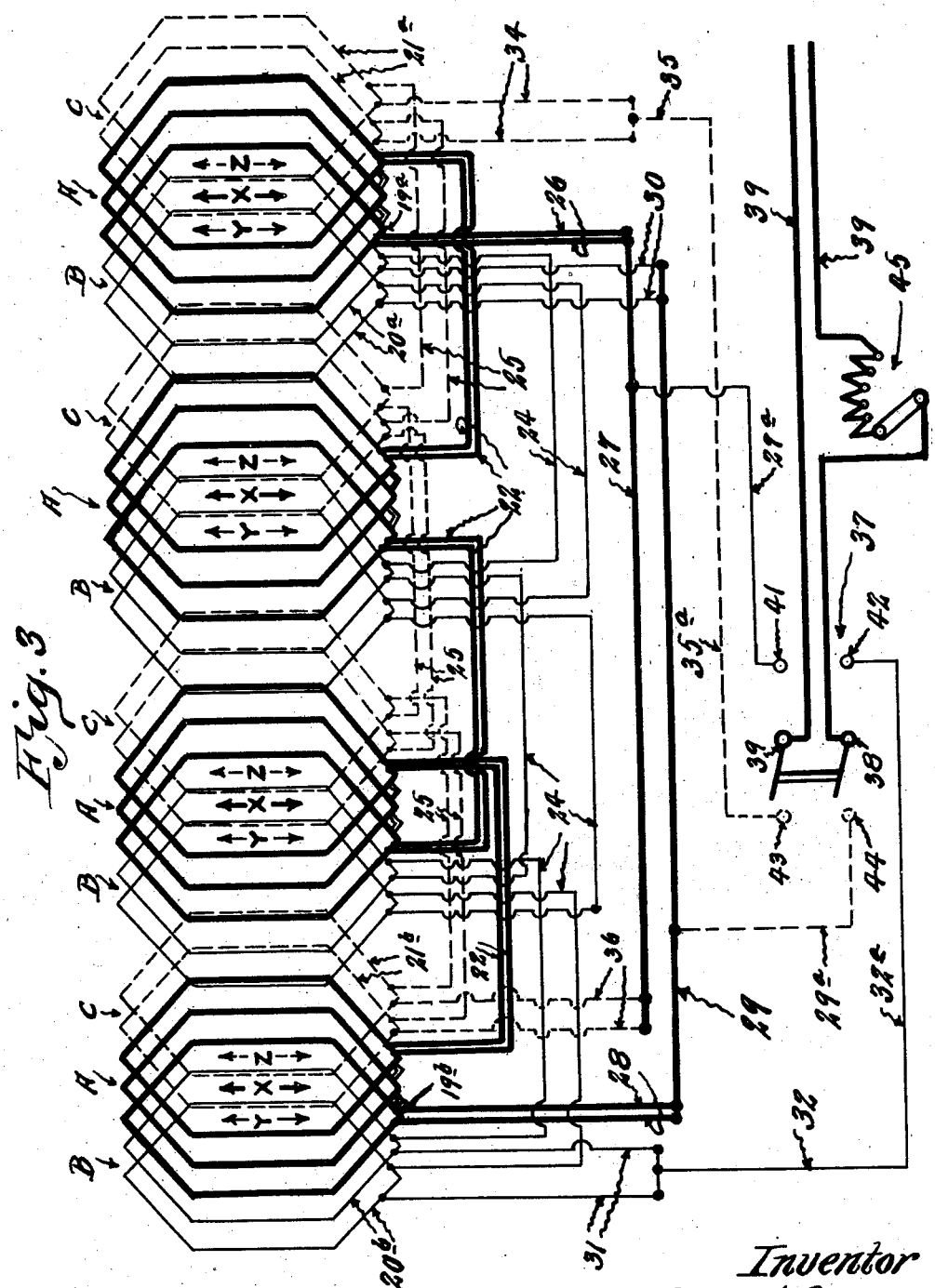

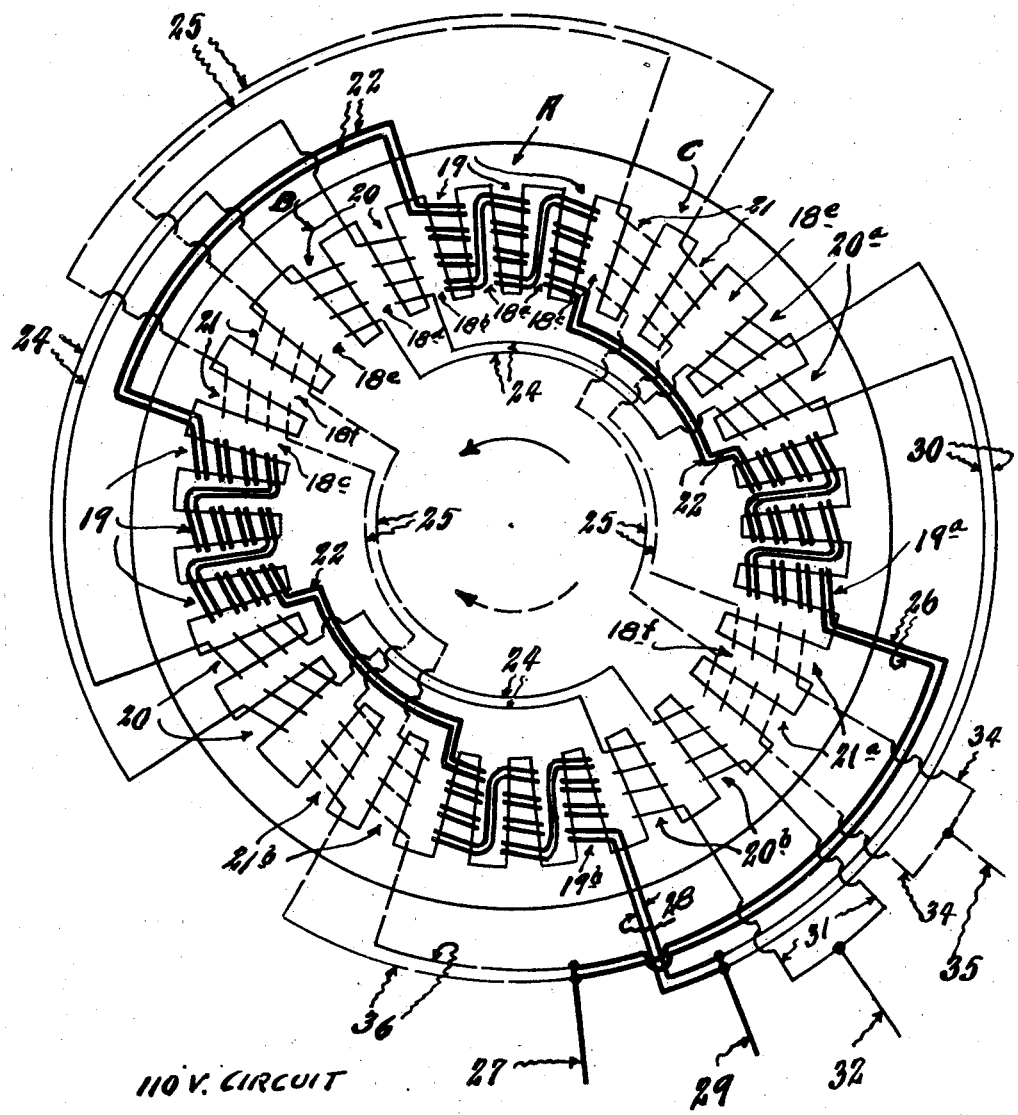

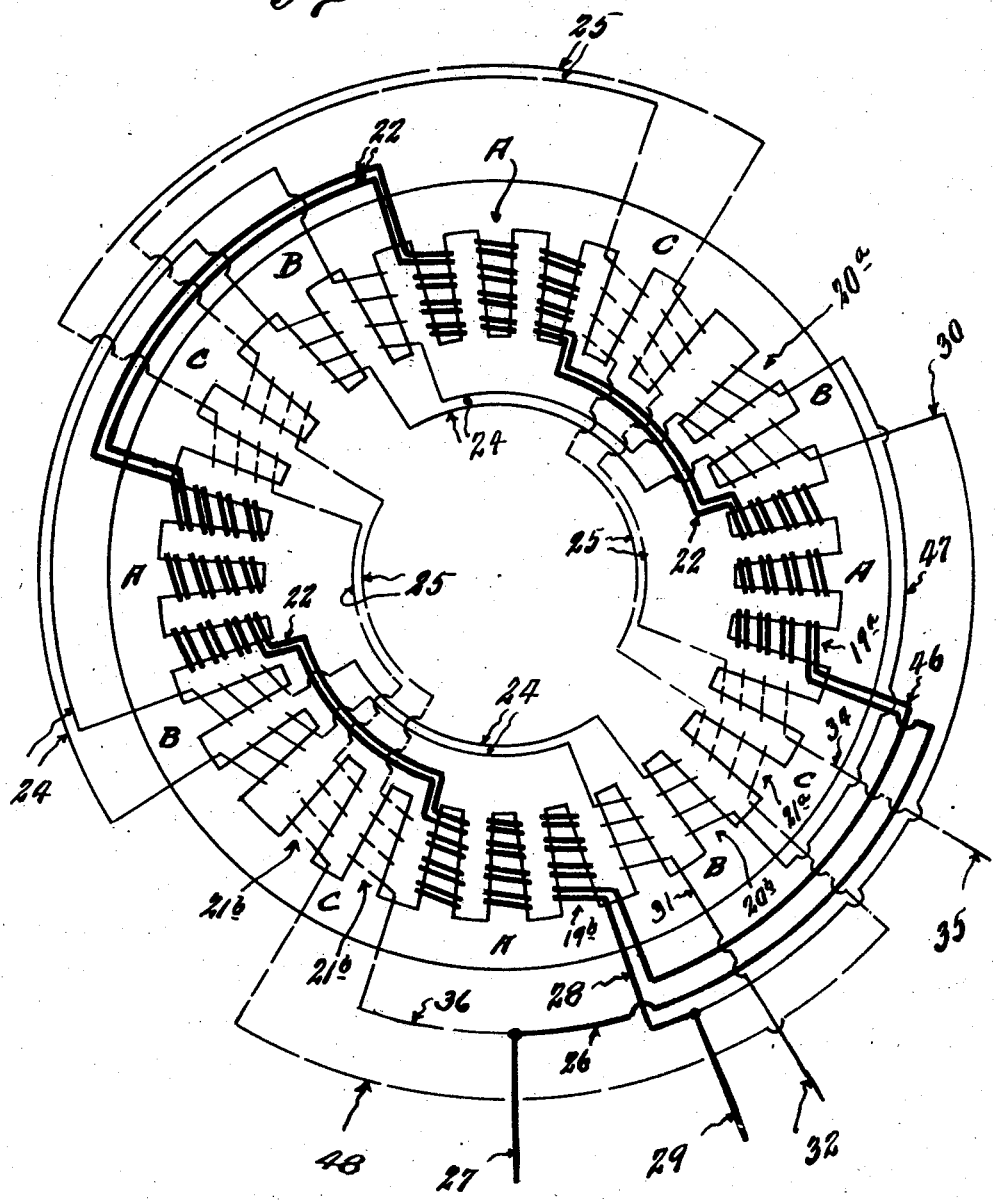

Patented Feb. 26, 1935

1,992,725

UNITED STATES PATENT OFFICE 1,992,725

SINGLE PHASE MOTOR

Swan J. Swanson, St. Louis, Mo., assignor of three-eighths to Charles S. Eggemann and one-eighth to Rudolph H. Bloeser, both of St. Louis, Mo.

Application February 15, 1932, Serial No. 592,982

2 Claims. (Cl. 172—277)

This invention relates to new and useful improvements in single phase motors.

The objects of the invention are to provide an alternating motor which will start from stand-still and attain full speed while it is directly connected to the full load.

Other objects of the invention are to provide a single phase motor having its rotor provided with commutated windings short-circuited by brushes and having a stator provided at each pole with a main winding and an auxiliary winding arranged to each side thereof, whereby by the energization of the corresponding set of said auxiliary windings simultaneously with said main windings said motor can be caused to operate in either direction.

Still other objects of the invention are to provide a single phase motor having a commutated rotor provided with stationary brushes short-circuited with each other and having a stator, the poles of which consist of main windings connected in series with each other and auxiliary windings arranged to one side of each main winding and connected in series with each other and in parallel with said main windings, said auxiliary windings being disposed to one side of the corresponding main windings to provide secondary stator poles which automatically set the rotor in operation.

Further objects of the invention are to provide a single phase motor adapted to start from stand-still with full load, said motor having a rotor provided with commutated windings and stationary brushes short-circuited with each other and cooperating with said windings, said motor having a stator provided with main windings connected in series with each other and provided with auxiliary windings arranged to each side of each main winding, said auxiliary winding being arranged in two groups in accordance with their disposition relatively to said main windings, the members of each group being connected in series and said groups being connected to the main lines in parallel with said main windings, there being provided a universal switch which connects one of said auxiliary winding groups with the main lines simultaneously with the main windings.

Additional objects of my invention are to provide a single phase motor which will automatically start from stand-still with full load in either direction and which can be operated at various speeds.

With these and other objects in view, my invention consists in certain novel features of construction and arrangement of parts, hereinafter more fully described and claimed, and illustrated in the accompanying drawings, in which—

Figure 1 is a diagrammatic view of the motor showing the rotor and the stator.

Figure 2 is an enlarged detail sectional view of the stator showing diagrammatically the disposition of the main and auxiliary windings.

Figure 3 is a diagrammatic view showing the poles of the stator and the connections therefor.

Figure 4 is a diagrammatic view showing the windings of the stator arranged for 110-volt circuit.

Figure 5 is a similar view but showing the stator windings arranged for 220-volt circuit.

Briefly stated, my invention appertains to single phase repulsion type motors. My improved motor is so constructed that it can be operated in either direction by the operation of an ordinary double throw switch. It will attain full operating speed while under full load and the speed of the motor can be regulated by means of an ordinary rheostat. The motor is of usual construction and has a commutated winding and brushes therefor which latter are connected together by the support on which they are mounted. The stator comprises a main winding and an auxiliary winding arranged to each side of the main winding. One or the other set of auxiliary windings is energized simultaneously with the main winding. This energization of either set of auxiliary windings shifts the center of the poles of the stator correspondingly to one side of the true center and thus causes operation of the rotor in the direction of the energized set of auxiliary windings.

Referring by numerals to the accompanying drawings, 10 indicates a stator of the motor and 11 a rotor. The latter is carried by a shaft 12 in the usual manner. Rotor 11 is provided with a winding which is connected in the usual manner to a commutator 14. Brushes 15 engage said commutator at selected points. These brushes are short-circuited together in any suitable manner as indicated at 16. Initially these brushes are adjustable about the axis of the shaft 12 in order to obtain proper operating conditions and thereafter the brushes occupy fixed relationship with respect to the axis of magnetization of the poles of said main windings.

The stator 10 consists of a plurality of laminations provided with inwardly opening radially disposed slots 18. In the instant case the stator is provided with 38 slots and is divided into four poles, the center of each being indicated by the letter X in the drawings (see Figs. 2 and 3).

Arranged in slots 18 in the usual manner are coils 19 of main windings A and coils 20 and 21, respectively, of the auxiliary windings B and C.

For the sake of clearness, the main winding A is indicated in the drawings in heavy lines, the auxiliary winding B which is located forwardly of each corresponding main winding is indicated in light lines, and the auxiliary winding C which is located rearwardly of each corresponding main winding is indicated in dotted lines.

In the present case the main windings A are wound with two wires connected in parallel for 110 volts and in series for 220 volts. The auxiliary windings B and C consist each of a single wire and the windings of the respective auxiliary sets are connected in series with each other. In the present case each auxiliary winding consists of two coils which are connected in parallel with each other and in series with the corresponding coils of the other auxiliary windings. As shown in the drawings, the three coils 19 of each main winding occupy two central slots 18a and one forward outer slot 18b and one rear slot 18c.

The coils 20 of each auxiliary winding B occupy one inner slot 18d and outer slots 18b and 18e. It will be observed that slot 18b is occupied also by the forward coils of corresponding main winding A.

The coils 21 of each auxiliary winding C are disposed in inner slot 18f and outer slots 18c and 18e. Slot 18c is occupied jointly with the rear coils of the corresponding main winding A and slots 18e are occupied jointly with the outer coils of the auxiliary winding B of the following pole. Thus the auxiliary windings are arranged equidistant on each side of the main winding.

As stated before the two parallel sets of coils 19 of each main winding are connected by connections 22 in series with the corresponding coils 19 of the adjacent main winding.

The coils 20 of each auxiliary winding B are connected in series with corresponding coils of the other auxiliary winding by connections 24 and the coils 21 of each auxiliary winding C are connected in series with corresponding coils of the other auxiliary windings by connections 25.

When the motor is used in 110-volt circuit (see Fig. 4) the terminal coils 19a of one of the main windings are connected by connections 26 to a supply line 27 and the terminal coils 19b of the other main winding are connected by connections 28 to a supply line 29. The terminal coils 20a of the corresponding auxiliary winding B are connected by connections 30 to supply line 29 whereby the last mentioned coils 20a are interconnected with the coils 19b. The terminal coils 20b of the corresponding main winding A are connected by connections 31 to a supply line 32.

The terminal coils 21a are connected by connections 34 to a supply line 35 and the terminal coils 21b are connected by connections 36 to the supply line 27. Thus the terminal coils 19a of one of the main windings are interconnected with the coils 21b of the auxiliary winding C of the following coil. A double throw switch 37 is provided and connected thereto by main lines 39. One of the contacts 41 of said switch is connected by a connection 27a to supply line 27 and the other contact 42 is connected by a connection 30 to the supply line 32. Thus when the switch is moved into engagement with these contacts the electric current flows from one of the main lines 39 through contact 41 and connection 27a to supply line 27, thence through connections 26 to the terminal coils 19a and thence through the remaining coils of the main winding. From this winding it passes through the other main windings by means of connections 22.

Upon reaching the terminal coils 19b of the last main winding A it passes through connections 28 to supply line 29 and thence through connections 30 to terminal coils 20a of auxiliary winding B. From this winding it then passes through the remaining auxiliary windings B by means of connections 24 and upon reaching terminal coils 20b it passes by means of connections 31 to supply line 32 and thence by connection 32a to switch contact 42 and the other main line.

The energization of auxiliary windings B in conjunction with the main windings A shifts the center of each pole from its true position, indicated by X to one side, indicated by Y. This shifting of the pole centers acts upon the rotor and causes the rotation thereof in the direction of said auxiliary winding B as indicated by solid line arrow in Figure 4.

When the switch 37 is thrown in the opposite direction it engages switch contact 43 and a switch contact 44. When in this position, the electric current passes from switch contact 43 through connection 35a to supply line 35 and then through connections 34 to terminal coils 21a of the auxiliary winding C. As these auxiliary windings are connected together by connections 25 the electric current traverses all of said auxiliary windings C and on reaching terminal coils 21b passes through connections 36 to main supply line 27 and thence through connections 26 to terminal coils 19a of the corresponding main winding. The electric current now passes through the remaining main windings and leaves the terminal coils 19b, by means of connections 28, and passes from supply line 29 by means of connection 29a to switch contact 44 and then to the other main line 39. The energization of the auxiliary windings C causes the shifting of the centers of the poles from their true position indicated by X rearwardly thereof into positions indicated by Z, thereby causing the rotor to operate in a direction indicated by dotted arrow in Figure 4. One of the main lines 39 is provided with a rheostat 45 by means of which the speed of the motor can be regulated in the usual manner.

When the motor is desired to be used on 220 volt circuit (see Fig. 5) one of the terminal coils 19a of one of the main windings may be connected by a connection 46 to one of the terminal coils 19b of the adjacent main winding, thereby connecting the coils 19 of said main windings in series. Similarly the coils 20 of the auxiliary windings B are connected in series with each other by connecting one of the terminal coils 20a by a connection 47 to one of the terminal coils 20b of the following auxiliary winding B. The coils 21 of the auxiliary windings C are connected in series of each other by connecting one of the terminal coils 21a by means of connection 48 to one of the terminal coils 21b of the adjacent auxiliary winding C.

I claim:

1. In a single phase repulsion motor the combination of a stator having a main winding arranged to provide a plurality of magnetic poles, each of which consists of two coils adapted to be connected in parallel with each other for 110 volts and in series with each other for 220 volts, a pair of auxiliary windings, each of which is arranged to provide a plurality of magnetic poles, the poles of one of said auxiliary windings arranged each to one side of the corresponding pole of said main winding and the poles of the other auxiliary winding arranged each to the other side of said poles of said main winding, a rotor having a commutated winding and brushes therefor, the latter being short-circuited together and occupying fixed relationship with the axes of magnetization of the poles of said main winding, and a double throw-switch for connecting said main winding in series with either one of said auxiliary windings whereby the poles of said main winding and the poles of the corresponding auxiliary winding are excited simultaneously, thereby shifting the centers of the poles of said main winding in the direction of the poles of said excited auxiliary winding and producing operation of said rotor in the corresponding direction.

2. In a single phase repulsion motor the combination of a stator having a main winding arranged to provide a plurality of magnetic poles, each of which consists of two coils adapted to be connected in parallel with each other for 110 volts or in series with each other for 220 volts, and two auxiliary windings, each of which is arranged to provide a plurality of magnetic poles, each pole of each auxiliary winding consisting of two single coils arranged in parallel with each other and connected in series with the respective coils of the adjacent poles of each auxiliary winding, the poles of one auxiliary winding being arranged to one side of the poles of said main winding and the poles of the other auxiliary winding being arranged on the opposite side thereof, a double throw switch for connecting said main winding in series with either one of said auxiliary windings whereby the centers of the magnetic poles of said main winding are shifted in the direction of the poles of the excited auxiliary winding, and a rotor having a commutated winding and a plurality of stationary brushes, the latter having fixed relationship with the axes of magnetization of the poles of said main winding, whereby said rotor is set in operation upon the simultaneous excitation of said main winding and one of said auxiliary windings in a direction of said excited auxiliary winding.

SWAN J. SWANSON.